(12) United States Patent
Butt

(10) Patent No.: US 11,704,672 B2
(45) Date of Patent: *Jul. 18, 2023

(54) SYSTEMS AND METHODS EMPLOYING SEARCHES FOR KNOWN IDENTIFIERS OF SENSITIVE INFORMATION TO IDENTIFY SENSITIVE INFORMATION IN DATA

(71) Applicant: SecurityMetrics, Inc., Orem, UT (US)

(72) Inventor: Alan B. Butt, Orem, UT (US)

(73) Assignee: SecurityMetrics, Inc., Orem, UT (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/897,048

(22) Filed: Jun. 9, 2020

(65) Prior Publication Data

US 2020/0302447 A1 Sep. 24, 2020

Related U.S. Application Data

(63) Continuation of application No. 13/149,579, filed on May 31, 2011, now Pat. No. 10,679,218.

(60) Provisional application No. 61/349,809, filed on May 28, 2010.

(51) Int. Cl.
*G06Q 20/40* (2012.01)
*G06F 16/903* (2019.01)

(52) U.S. Cl.
CPC ... *G06Q 20/4016* (2013.01); *G06F 16/90344* (2019.01)

(58) Field of Classification Search
CPC .............. G06F 21/606; G06F 21/6227; G06F 21/6245; G07F 7/0846; G07F 7/0866
See application file for complete search history.

(56) References Cited

U.S. PATENT DOCUMENTS

| 6,786,400 B1 * | 9/2004 | Bucci ........................ G07F 7/08 235/382 |
| 7,328,430 B2 | 2/2008 | Fairweather |
| 8,256,006 B2 | 8/2012 | Grzymala-Busse et al. |

(Continued)

OTHER PUBLICATIONS

USPTO as International Search Authority, "International Search Report and Written Opinion," International Application No. PCT/US2011/038632, dated Sep. 29, 2011.

(Continued)

*Primary Examiner* — Angelica Ruiz
(74) *Attorney, Agent, or Firm* — Dentons Durham Jones Pinegar

(57) ABSTRACT

A data string that includes potentially sensitive information, such as an account number for a payment card, may be evaluated to determine whether or not any portion of the data string encodes a known identifier of sensitive information, such as a known bank identification number (BIN). A fixed number of bytes of the data string may be analyzed using a trie algorithm, in which the value of a first byte is compared with the value of a corresponding first character of the known identifier. A second byte is then compared with a set of values of corresponding second characters, which accompany the first character of the known identifier. Then the value of a third byte of the data string is compared with a set of values of corresponding third values, which accompany the first and second characters of the known identifier. The use of a trie algorithm decreases the length of the search process by several orders of magnitude.

19 Claims, 4 Drawing Sheets

(56) References Cited

U.S. PATENT DOCUMENTS

| | | | |
|---|---|---|---|
| 8,407,261 B2 | 3/2013 | Koyanagi et al. | |
| 10,679,218 B2 | 6/2020 | Butt | |
| 2002/0112167 A1 | 8/2002 | Boneh et al. | |
| 2003/0140007 A1 | 7/2003 | Kramer et al. | |
| 2003/0236748 A1 | 12/2003 | Gressel et al. | |
| 2007/0074273 A1 | 3/2007 | Linden | |
| 2007/0162890 A1 | 7/2007 | Meier et al. | |
| 2007/0276765 A1 | 11/2007 | Hazel et al. | |
| 2008/0040275 A1 | 2/2008 | Paulsen et al. | |
| 2008/0126301 A1 | 5/2008 | Bank et al. | |
| 2008/0208850 A1* | 8/2008 | Boyce | G06F 16/90344 |
| 2008/0216174 A1 | 9/2008 | Vogel et al. | |
| 2008/0270342 A1* | 10/2008 | Ruehle | G06F 16/90344 |
| 2009/0083545 A1* | 3/2009 | Heim | G06F 21/6263 |
| | | | 707/E17.014 |
| 2009/0138329 A1 | 5/2009 | Wanker | |
| 2009/0171947 A1* | 7/2009 | Karayel | G06F 16/90344 |
| | | | 707/999.005 |
| 2009/0282039 A1 | 11/2009 | Diamond | |
| 2009/0289112 A1 | 11/2009 | Bonalle et al. | |
| 2009/0310778 A1 | 12/2009 | Mueller et al. | |
| 2010/0012589 A1 | 1/2010 | Ribault et al. | |
| 2010/0050249 A1 | 2/2010 | Newman | |
| 2010/0106611 A1 | 4/2010 | Paulsen et al. | |
| 2011/0040983 A1 | 2/2011 | Grzymala-Busse et al. | |

OTHER PUBLICATIONS

Baeza-Yates, R.A. et al., "Fast Text Searching for Regular Expressions or Automaton Searching on Tries", 1996.
United Kingdom Intellectual Property Office, "Examination Report," GB Application No. 1221976.2, dated Oct. 5, 2017.
United Kingdom Intellectual Property Office, "Examination Report," GB Application No. 1221976.2, dated Oct. 5, 2018.
United Kingdom Intellectual Property Office, "Examination Report," GB Application No. 1221976.2, dated Nov. 23, 2018.
United Kingdom Intellectual Property Office, "Examination Report," GB Application No. 1221976.2, dated Jan. 17, 2019.

* cited by examiner

SYSTEMS AND METHODS EMPLOYING SEARCHES FOR KNOWN IDENTIFIERS OF SENSITIVE INFORMATION TO IDENTIFY SENSITIVE INFORMATION IN DATA

CROSS-REFERENCE TO RELATED APPLICATION

This application is a continuation of U.S. patent application Ser. No. 13/149,579, filed on May 31, 2011 and titled SYSTEMS AND METHODS EMPLOYING SEARCHES FOR KNOWN IDENTIFIERS OF SENSITIVE INFORMATION TO IDENTIFY SENSITIVE INFORMATION IN DATA ("the '579 Application"), now U.S. Pat. No. 10,679,218, issued Jun. 9, 2020. The '579 Application included a claim for the benefit of priority to the to the May 28, 2010, filing date of U.S. Provisional Patent Application 61/349,809, titled "SYSTEMS FOR DETERMINING WHETHER BATCHES OF DATA INCLUDE STRINGS THAT CORRESPOND TO SENSITIVE INFORMATION ("the '809 Provisional Application"), was made pursuant to 35 U.S.C. § 119(e). The entire disclosures of the '809 Provisional Application and '579 Application are hereby incorporated herein.

TECHNICAL FIELD

The present invention relates generally to methods and systems for scanning systems that collect and disseminate sensitive information (e.g., merchants' systems that process transactions with payment cards, etc.) and, more specifically, to methods and systems for recognizing sensitive information (e.g., payment card account numbers, etc.) in large groups of data.

RELATED ART

Credit card and debit card, or "payment card," processing involves a number of parties, including a card association, an issuer, a cardholder, an acquirer, and a merchant.

When a potential cardholder, such as an individual or an organization, wants a payment card, they approach an issuer. The issuer is a financial institution. If the potential cardholder meets certain requirements (e.g., credit rating, account balance, income, etc.), the issuer may choose to issue a payment card to the cardholder. The payment card contains sensitive information about the cardholder, including the cardholder's identity and account information, which enables the cardholder to transfer funds from an account held by the issuer or to draw against a corresponding line of credit provided by the issuer.

A cardholder makes a purchase, or initiates a transaction, with the payment card by presenting the same to a merchant. Information obtained from the payment card by the merchant is then processed. The information may be processed using equipment that may be provided by an acquirer, which is a financial institution with which the merchant has an established relationship. As the information is processed, it is transferred to a card association (e.g., VISA, MASTERCARD, etc.), either directly from the merchant or through the acquirer. The card association transmits the information about the transaction to the issuer. The issuer then authorizes or declines the transaction. If the transaction is authorized, the issuer funds the transaction by transferring money to the acquirer through the card association. When a debit card is used, funds are transferred from the cardholder's account with the issuer to the acquirer. When the cardholder uses a credit card, the cardholder incurs a debt with the issuer, for which the cardholder must eventually reimburse the issuer.

Whenever a cardholder uses a payment card to make a purchase, the merchant obtains information, including the account number, from the payment card. While that information may be obtained in a number of ways, the merchant typically uses some type of electronic processing equipment to transmit the information, by way of a communication element (e.g., an Internet connection, etc.) to its acquirer or a card association. Sometimes the information is stored in memory associated with the processing equipment. That information may be stored in groups that include long strings of data.

Since the processing equipment includes a communication element, any memory associated with the processing equipment may be subject to hacking. Thus, any information stored in memory associated with processing equipment may be subject to theft. When payment card information is stolen, that information may be used to make unauthorized purchases.

DISCLOSURE

In one aspect, a method of the present invention includes various embodiments of methods and systems for identifying potentially sensitive information (e.g., account numbers for payment cards, etc.). In one embodiment, strings of consecutive bytes with values that correspond to characters of interest (e.g., decimal numerals or numeric digits (i.e., a character having a value that corresponds to a base-ten, or Arabic, numeral), etc.) and with lengths that correspond to a length of sensitive information of interest (e.g., a payment card account number, etc.) are identified as including potentially sensitive information. Such a string of bytes may be referred to as a "tagged string."

Once potentially sensitive information (e.g., an account number for a payment card, etc.) has been identified, the potentially sensitive information may be subjected to further evaluation to determine, with an increased likelihood, whether or not the potentially sensitive information is likely to actually comprise sensitive information.

In one embodiment, a tagged string that includes potentially sensitive information (e.g., an account number for a payment card, etc.) may be evaluated to determine whether or not it includes (e.g., begins with, etc.) a known identifier of sensitive information (e.g., a known bank identification number (BIN), etc). Searching may be "ordinal" (e.g., one byte searching, then two byte searching (both little endian (LE) and big endian (BE)), then four byte searching (both LE and BE), etc.) to enable the search algorithm to identify data of interest across a plurality of Unicode Transformation Formats (UTFs), or regardless of the particular type of UTF, in which the data may be encoded (e.g., UTF-8, UTF-16LE, UTF-16BE, UTF-32LE, UTF-32BE). For the sake of simplicity, the term "byte," as used herein, includes a single byte in UTF-8 encoding, an adjacent pair of bytes in UTF-16 encoding, and an adjacent set of four bytes in UTF-32 encoding.

A search for a known identifier that incorporates teachings of the present invention may include an analysis of a fixed number of bytes (e.g., four, six, etc.) in (e.g., at the beginning of, etc.) a tagged string. These bytes may be evaluated in a so-called "trie" algorithm, in which a first byte is analyzed at a first node of the "trie." If the value of the first byte does not correspond to a first value present in a known identifier (e.g., a BIN, etc.), the known identifier search may be terminated and the tagged string is no longer considered to include potentially sensitive information. If, in the alternative, the value of the first byte does match with a corresponding first value of a known identifier, the search proceeds to a second node of the trie. The value of a second byte of the tagged string is then compared with one or more second values of a known identifier that also includes the first value (i.e., a database of a group of second values that are known to follow the identified first value in a group of known identifiers). Again, if the value of the second byte does not correspond to the second value of a known identifier, the search may be terminated and the tagged string may no longer be considered to comprise potentially sensitive information. If the value of the second byte corresponds to the second value of a known identifier, the process continues to a third node of the trie, where the process is repeated. If, following conclusion of the analysis, all of the evaluated bytes match a corresponding combination of values of a known identifier, the tagged string may be subjected to further analysis.

In another embodiment, such further evaluation may include a delimiter search, in which the bytes adjacent to the beginning and end of the string of bytes that correspond to a tagged string of data are evaluated to determine whether a known delimiter character has been used to set a string of bytes that may corresponding to sensitive information apart from adjacent data.

One or more of the evaluation processes of the present invention, including, but not limited to, searching for a known identifier, may be used to provide an increased level of confidence that the bytes of a particular data string correspond to characters of potentially sensitive information of interest. Any tagged strings that are unlikely to include the potentially sensitive information of interest may be disregarded. In some embodiments, the further evaluation comprises a much less intensive process and, thus, less time to complete, than a final process for verifying whether a data string actually includes sensitive information of interest. Thus, quicker processes may be used to disregard, or weed out, the majority of data within a group, while the more intensive final process may be reserved for data strings that are likely to include the sensitive information of interest.

In some embodiments, known processes may be used to verify that a tagged string includes sensitive information (e.g., an account number for a payment card, etc.). In a specific embodiment, a known validation or "checksum" algorithm, such as the Luhn algorithm, may be used to determine whether or not a tagged string encodes an actual payment card account number.

A system of the present invention may execute one or more of the processes that have been described above. The above-described processes may be implemented in the form of a program that may be executed by processing element (e.g., computer processor, etc.) or that evaluates, or scans, stored data. The data may be stored in memory associated with the processing element, on in memory of a separate electronic device. The processing element may access the stored data by way of a suitable communication element, such as circuitry and/or wiring within the same electronic device (e.g., computer, etc.) as the processing element, a wired communication link between the electronic device of which the processing element is a part and a separate electronic device of which the memory is a part, or remotely (e.g., over an Internet connection, etc.).

Other aspects, as well as features and advantages of various aspects, of the present invention will become apparent to those of ordinary skill in the art through consideration of the ensuing description, the accompanying drawings, and the appended claims.

DETAILED DESCRIPTION

Figure 1:
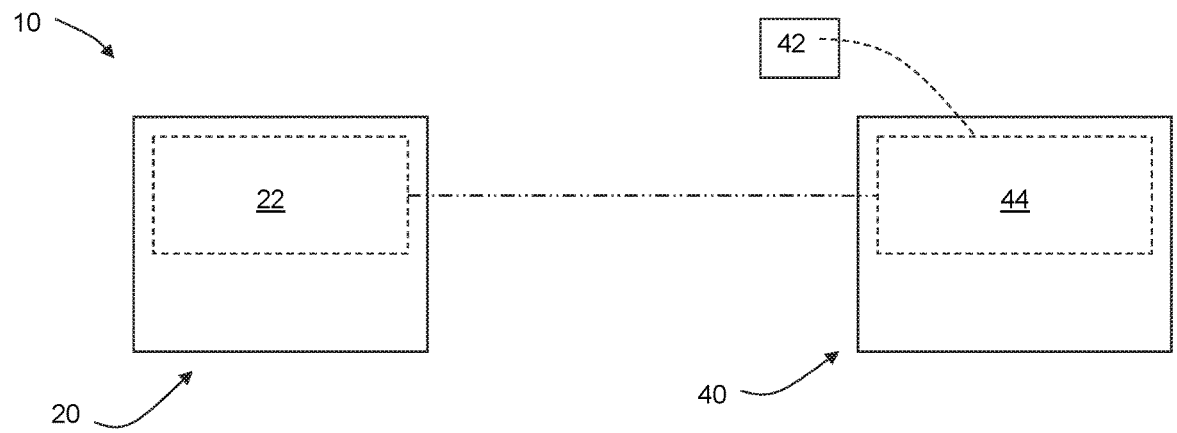
FIG. 1 is a schematic representation of an embodiment of an evaluation system of the present invention, which includes a collection system and a scanning device for evaluating the collection system.

The present invention includes various embodiments of systems for evaluating data to determine whether or not the data includes potentially sensitive information. FIG. 1 schematically depicts an embodiment of such an evaluation system 10, in which an electronic device, referred to herein as a "scanning device 20," is configured to communicate with and scan data stored by a component of another electronic device that collects sensitive information, which is referred to herein as a "collection system 40."

The collection system 40 includes a memory device (e.g., a hard drive, etc.), or "memory 42" for the sake of simplicity, that stores data 44, which potentially includes sensitive information. In addition to memory 42, a collection system 40 of an evaluation system 10 of the present invention may include or be associated with a processing element 22, such as a microprocessor, a microcontroller, or the like.

The scanning device 20 is programmed to determine whether the data 44 stored by the memory 42 of the collection system 40 includes any potentially sensitive information. Programming of the scanning device 20, which may be in the form of software or firmware, controls operation of a processing element 22 of the scanning device 20. Some embodiments of processing elements 22 that may be included in a scanning device 20 of an evaluation system 10 of the present invention include, without limitation, microprocessors, microcontrollers, and elements that may be configured to execute a particular program. In embodiments where a scanning device 20 of an evaluation system 10 of the present invention is configured for direct connection to a collection system 40, the scanning device 20 may be portable (e.g., a laptop computer; a hand-held computer, such as a so-called "smart phone," etc.; a dedicated scanner; etc.). In embodiments where a scanning device 20 is configured to remotely scan one or more collection systems 40, the scanning device 20 may comprise a server, or a device (e.g., a dedicated scanning device, a smart phone, etc.) that may connect remotely to the collection system 40 (e.g., through a cellular telephone data connection, etc.).

Communication between the memory 42 of the collection system 40 and a processing element 22 of the scanning device 20 may be established in any suitable manner known in the art. In embodiments where both the scanning device 20 and the collection system 40 comprise electronic devices, a communication link between the scanning device 20 and the collection system 40 may be direct or indirect. A direct connection may include a physical, or "wired," coupling between the scanning device 20 and the collection system 40, or it may include a close proximity wireless connection (e.g., a Bluetooth connection, a wireless local area network (WLAN) (e.g., a WiFi network operating in accordance with an IEEE 802.11 standard, etc.). An indirect connection may be established more remotely (e.g., over the Internet, etc.). In some embodiments where an indirect connection is established between the scanning device 20 and the collection system 40, the scanning device 20 of an evaluation system 10 that incorporates teachings of the present invention may be located at a central location, and may be configured to selectively communicate with a plurality of different collection systems 40 at a plurality of different locations.

An evaluation system 10 may be used in a variety of contexts or environments where sensitive information (e.g., account numbers, usernames and associated passwords, Social Security numbers or similar identifiers, etc.) is used. In a specific embodiment, the evaluation system 10 is configured to scan for and identify potential credit card numbers and debit card numbers, which are collectively referred to herein as "payment card numbers." The scanning device 20 in such an embodiment may comprise a server under control of an approved scanning vendor (ASV), which is a party that has been authorized to access and evaluate the systems (i.e., the collection systems 40, such as card readers, associated computers, etc.) employed by one or more merchants to acquire information from a consumer's payment card.

Figure 2:
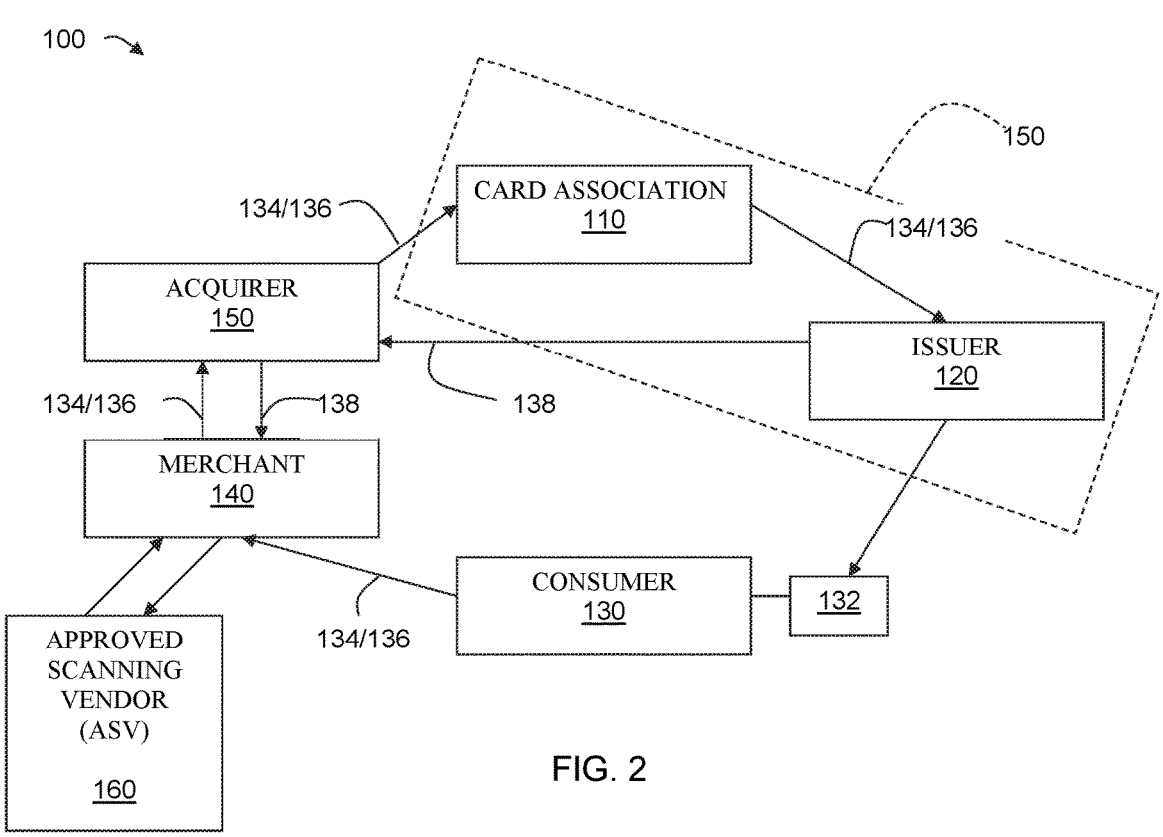
FIG. 2 is a diagram that illustrates an embodiment of a network in which sensitive information, such as account information corresponding to payment cards, may be collected and disseminated, and in which searches for sensitive information may be conducted.

The relationships between the various parties that may be involved in payment card transactions are illustrated by the schematic representation of FIG. 2. More specifically, FIG. 2 depicts a network 100 that includes a card association 110; an issuer 120; a cardholder, or consumer 130; a merchant 140; and an acquirer 150.

The card association 110 is generally recognized as the entity whose identity appears most prominently on a payment card 132. Examples of card associations 110 include, but are certainly not limited to, Visa, Master Card, American Express, and Discover. As depicted, the card association 110 may act as a gateway between an issuer 120 and an acquirer 150, enabling the authorization and funding of a consumer 130's transactions. In some embodiments, a card association 110 (e.g., American Express, Discover, etc.) may also serve as the issuer 120, as depicted by box 150 in FIG. 2.

The issuer 120 may be a financial institution. As FIG. 2 schematically represents, there is a direct relationship between the issuer 120 and each of its consumers 130: the issuer 120 provides each of its consumers 130 with a payment card 132. In so doing, the issuer 120 may determine whether or not each of its consumers 130 meets certain qualifications, such as credit history, income or revenue, available funds, employment status, and other indicators of the ability of a particular consumer 130 to pay for transactions that will be enabled by use of the payment card 132.

The consumer 130 may be an individual, a business, or any other entity. Each consumer 130 should assume responsibility for its payment card 132, as well as the information on or otherwise associated with the payment card 132.

Each merchant 140 is a party that provides goods or services to a variety of consumers 130. In the network 100, a merchant 140 provides consumers 130 with the option to use payment cards 132 to complete transactions for the merchant 140's goods or services. When a consumer 130 chooses to use a payment card 132 to complete a transaction, the merchant 140 uses a collection system 40 (FIG. 1) to obtain account information 134 (e.g., an account number, an expiration date, information about the consumer 130's identity, etc.) from the payment card 132. That account information 134 is then transmitted, along with information about the transaction, or "transaction information 136," by the collection system 40 to the card association 110. The transaction information 136 may include data indicative of the point of sale, the date and time of the transaction, goods or services purchased as part of the transaction, the monetary amount of the transaction, and the like.

The account information 134 and the corresponding transaction information 136 may be transmitted to the card association 110 either directly or through the acquirer 150, which is a financial institution (e.g., a bank, etc.) with which the merchant 140 has an established relationship.

The card association 110 then transmits the account information 134 and the corresponding transaction information 136 to the issuer 120, which authorizes or declines the transaction. If the transaction is authorized, the issuer 120 funds the transaction. Where an acquirer 150 is involved, the issuer 120 transfers money 138 to the acquirer 150 through the card association 110. When the payment card 132 is a debit card, funds are transferred from the cardholder's account with the issuer 120 to the acquirer 150. When the consumer 130 uses a credit card, the consumer 130 incurs a debt with the issuer 120, for which the consumer 130 must eventually reimburse the issuer 120.

The Payment Card Industry (PCI), an organization that governs the network 100, sets standards for the collection, storage, and transmission of account information 134 within the network 100. These standards are known as PCI's Data Security Standards (DSS). In view of the ever-increasing danger that sensitive account information 134 will be stolen, the PCI often modifies, typically increasing, the DSS.

Each merchant 140 within the network 100 (i.e., each merchant 140 that accepts payment cards 132 from its consumers 130) must comply with the current version of the DSS or risk fines from PCI. In addition, a merchant 140 that does not comply with the current DSS may be liable to its consumers 130 for the misappropriation of their sensitive account information 134.

In order to ensure that the merchants 140 within the network 100 comply with the current DSS, the network 100 may also include one or more approved scanning vendors 160 (ASVs). An ASV 160 is an entity that has been certified by PCI to evaluate the systems (e.g., collection systems 40) that are used within the network 100 to collect and transmit account information 134, and to determine whether or not those systems are DSS compliant. Each ASV 160 may be employed by one or more merchants 140, by one or more acquirers 150, or by a card association 110.

With returned reference to FIG. 1, an ASV 160 (FIG. 2) may use a scanning device 20 to verify whether or not a merchant's collection systems 40 are DSS compliant. Communication may be established between the processing element 22 of the scanning device 20 and various components of a merchant 140's collection system 40, including, but not limited to, its memory 42. Communication between the processing element 22 and the collection system 40 may be direct or remote, and may be established by any suitable technique or protocol.

In determining whether or not a merchant's collection system 40 is DSS compliant, the processing element 22 of the ASV 160's (FIG. 2) scanning device 20 operates under control of one or more programs (e.g., computer programs, etc.) to evaluate certain aspects of the collection system 40. Various embodiments of programs that control operation of the processing element 22, as well as the processes that are effected by such programs in accordance with teachings of the present invention, are described hereinafter.

In a specific embodiment, a process or program of the present invention may cause the processing element 22 of a scanning device 20 to evaluate data 44 stored by one or more components (e.g., memory 42, etc.) of a merchant 140's (FIG. 2) collection system 40 to determine whether the data 44 includes account information 134 that corresponds to one or more payment cards 132 (FIG. 2). More specifically, a program of the present invention may be configured to effect a process in which data 44 is evaluated to determine whether it includes any data strings that are likely to comprise payment card account numbers. Such a process 200 is illustrated by the diagram of FIG. 3.

Figure 3:
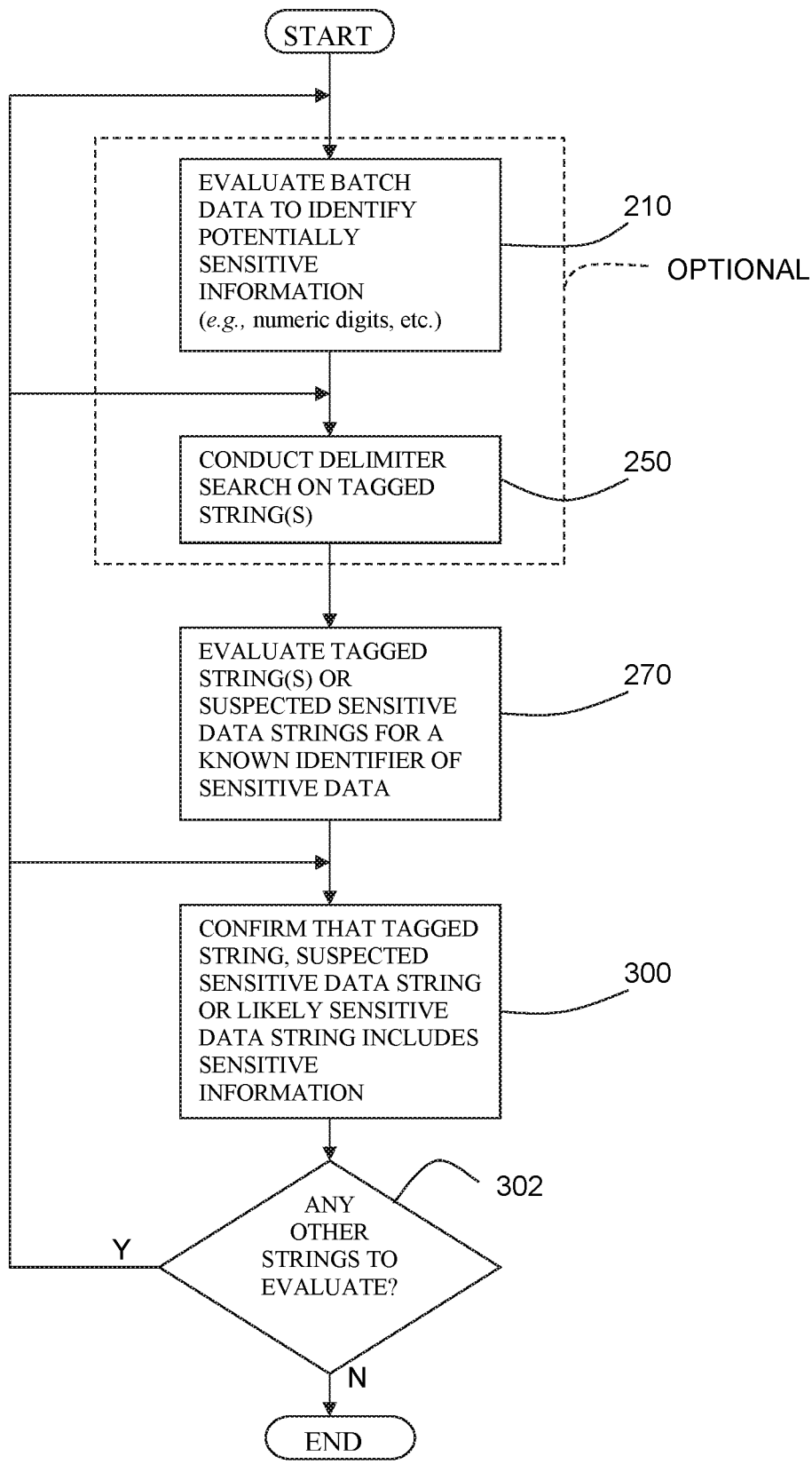
FIG. 3 is a flow chart that illustrates an embodiment of a process by which data is evaluated to determine whether any sensitive information of interest has been stored therein.

In FIG. 3, at reference 210, data 44 stored by memory 42 associated with a merchant's collection system 40 (FIG. 1) is evaluated. Specifically, the data 44 is evaluated to determine whether or not it includes any strings of data that might comprise sensitive information, such as a payment card account number or the like. Without limiting the scope of the present invention, a payment card account number may be thirteen (13) to sixteen (16) digits long. In memory, or the data 44, a payment card account number may comprise a number of consecutive bytes (e.g., thirteen (13) to sixteen (16) in UTF-8 (8-bit Unicode Transformation Format) encoding, twenty-six (26) to thirty-two (32) in UTF-16 (16-bit Unicode Transformation Format) encoding, fifty-two (52) to sixty-four (64) in UTF-32 (32-bit Unicode Transformation Format) encoding, etc.) that correspond to thirteen (13) to sixteen (16) numeric digits.

Any suitable technique may be used to identify each string of data within the data 44 (FIG. 1) that includes the appropriate number of consecutive bytes that correspond to thirteen (13) to sixteen (16) numeric digits. One embodiment of such a method includes an "interval scanning" technique, in which a string of data is evaluated in intervals. When such a method is used, bytes of data in periodic sequence (e.g., every thirteenth byte for UTF-8 encoding, two sequential bytes of every twenty-six bytes for UTF-16 encoding, four sequential bytes of every fifty-two bytes for UTF-32 encoding, etc.) are evaluated, while the bytes in between are initially ignored. To enable the search algorithm to identify data of interest across a plurality of formats, or regardless of the particular type of format, in which the data may be encoded (e.g., ASCII/UTF-8, UTF-16LE, UTF-16BE, UTF-32LE, UTF-32BE), a so-called "ordinal" search (e.g., one byte searching for a numeric digit, then two byte searching (both little endian (LE) and big endian (BE)) for a numeric digit, then four byte searching (both LE and BE) for a numeric digit, etc.) may be conducted.

If the value of the byte corresponds to a decimal numeral (i.e., 0, 1, 2, 3, 4, 5, 6, 7, 8, or 9), that byte is identified as a tagged numeric byte, from which a byte-by-byte analysis, or sequential search, may then commence. In the sequential search, bytes adjacent to both "sides" of the tagged numeric byte may be evaluated to determine whether or not they also correspond to decimal numerals. The sequential search may continue until a determination is made that the number of sequential bytes that correspond to decimal numerals is too short (e.g., <13 digits, etc.) or too long (e.g., >16 digits, etc.) to comprise an account number for a credit card or debit card.

With returned reference to FIG. 3, at reference 250, an embodiment of a preliminary evaluation process that is referred to herein as a "delimiter search" may be conducted. In a delimiter search, a pair of bytes that surround a tagged string that comprises possible data of interest may be analyzed. If a delimiter search reveals that delimiters surround a tagged string, the tagged string may be identified as a "suspected sensitive data string." Further analysis of a suspected sensitive data string may be conducted at reference 270 of FIG. 3.

At reference 270 of FIG. 3, a tagged string or a suspected sensitive data string may be evaluated to determine whether it includes a known identifier of sensitive data. The evaluation of a tagged string or a suspected sensitive data string to detect any known identifiers of sensitive data may be effected in any suitable manner. Such an evaluation may be conducted in an ordinal fashion (e.g., one byte searching, then two byte searching (both little endian (LE) and big endian (BE)), then four byte searching (both LE and BE), etc.). In embodiments where the data is being evaluated to identify potential account numbers for payment cards, the known identifier may comprise a bank identification number (BIN). As known in the art, BINs include four to six consecutive numeric digits, which typically comprise the first digits in an account number.

A BIN search that incorporates teachings of the present invention may include an analysis of a fixed number of bytes that correspond to digits (e.g., four, six, etc.) of (e.g., at the beginning of, at the end of, in the middle of, scattered throughout, etc.) a potential account number for a payment card. These bytes may be analyzed in a so-called "trie" algorithm, in which a first byte is evaluated at a first node of the "trie." If the value of the first byte does not correspond to a first digit that is known to be present in a BIN, the BIN search may be terminated and the string of data is no longer considered to be a potential account number. If, in the alternative, the value of the first byte is equal to, or matches, a first digit of a known BIN, the search proceeds to a second node of the trie that corresponds to the identified value of the first digit (i.e., a database of a group of second digits that are known to follow the identified first digit in a group of known BINs). Again, if the second analyzed byte does not have a value equal to the second digit of any known BIN that also includes the first digit, the search may be terminated and the string of data may no longer be considered to comprise a potential account number. If the value of the second analyzed byte is equal to the second digit of a known BIN, the process continues to a third node of the trie, where the BIN search continues. If, following conclusion of the BIN search, the values of all of the analyzed bytes match the corresponding digits of a known BIN, the potential account number may be subjected to further analysis.

Figure 4:
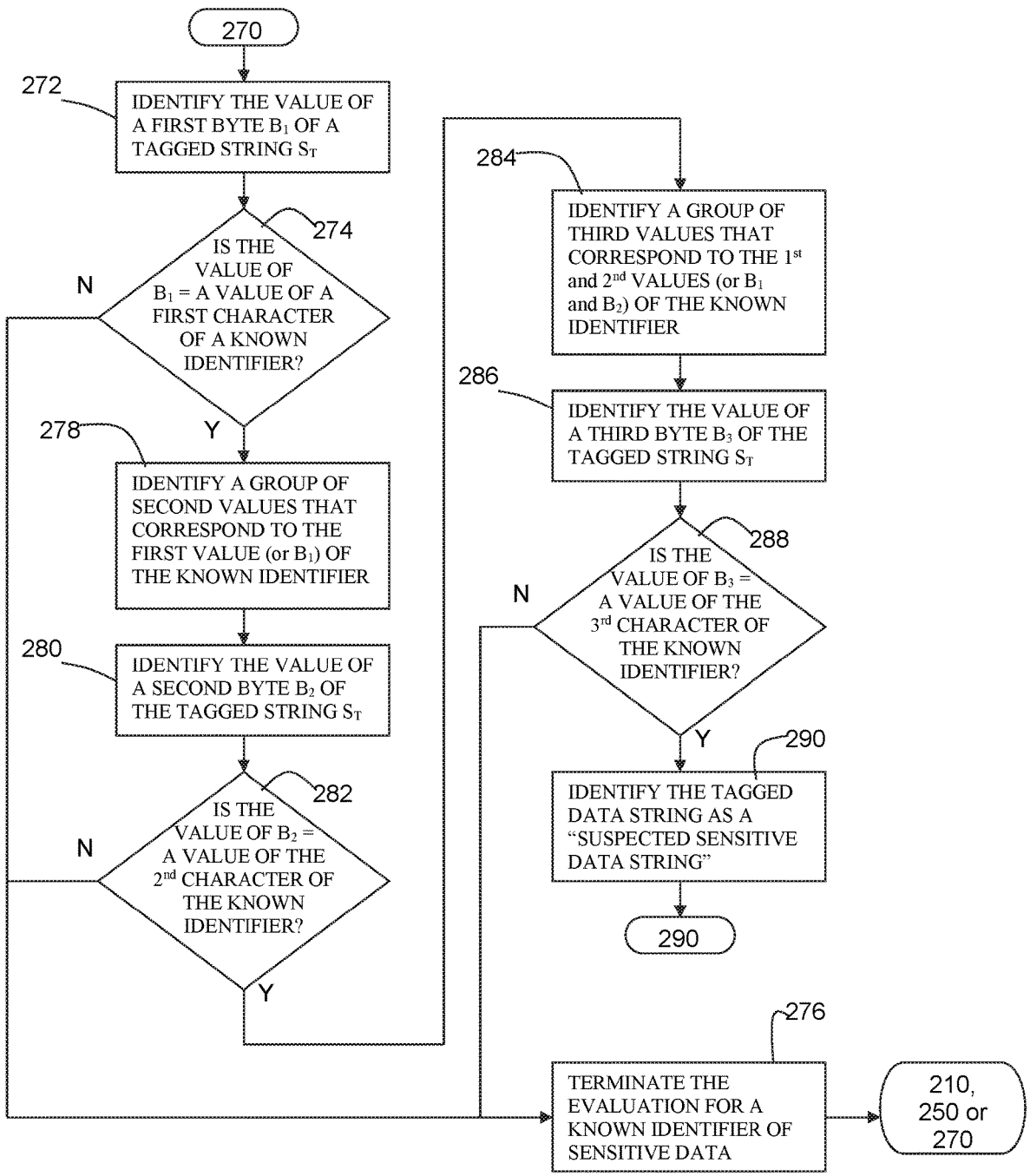
FIG. 4 is a flow chart that depicts an embodiment in which various bytes of a tagged string of data are analyzed to determine whether their values match with corresponding values of a known identifier of sensitive data.
Figure 4A:
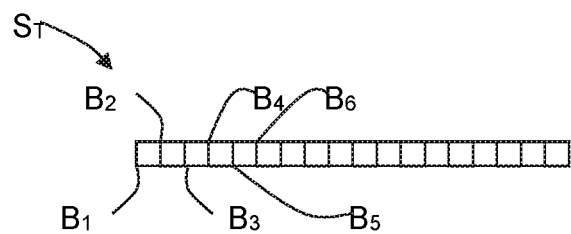
FIGS. 4A and 4B are schematic representations of the evaluation depicted by FIG. 4.
Figure 4B:
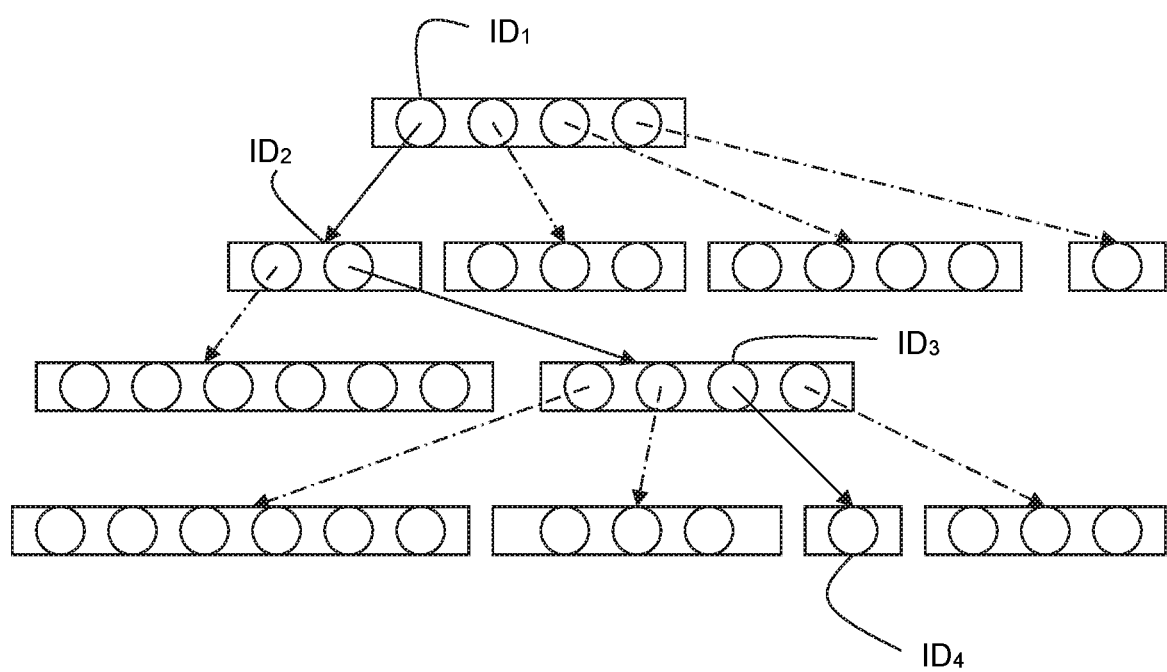

FIGS. 4, 4A, and 4B depict a specific embodiment of a method in which a trie algorithm is used to determine whether a suspected sensitive data string includes an identifier of sensitive data.

At reference 272 of FIG. 4, the value of a selected first byte $B_1$ of a tagged string or a suspected sensitive data string is identified. At reference 274, the value of the first byte $B_1$ is compared with a set of possible first values $ID_1$ of known identifiers of the type of data (e.g., BINs, etc.) being searched for. Each value is represented as a circle in FIG.

4B. If the value of the first byte $B_1$ does not match a possible first value $ID_1$ for that particular type of data, it is apparent that the tagged string or suspected sensitive data string does not actually include the type of sensitive data for which the search is being conducted, the tagged string or suspected sensitive data string is disregarded, and the search is terminated, at reference 276.

If the value of the first byte $B_1$ equals one of the possible first values $ID_1$, process flows to reference 278, where a group of second values $ID_2$ is selected that correspond to (e.g., may follow, etc.) that possible first value $ID_1$ in a known identifier. The value of a second byte $B_2$ of the tagged string or suspected sensitive data string is then identified, at reference 280, and compared, at reference 282 with the second values $ID_2$. If the value of the second byte $B_2$ does not match a possible second value $ID_2$ for that particular type of sensitive data, the tagged string or suspected sensitive data string does not include the type of sensitive data for which the search is being conducted, and the search is terminated, at reference 276.

If the value of the second byte $B_2$ equals one of the possible second values $ID_2$, process flows to reference 284, where a group of third values $ID_3$ is selected that correspond to the combination of the possible first value $ID_1$ and second value $ID_2$ in a known identifier of sensitive data. The value of a third byte $B_3$ of the tagged string or suspected sensitive data string is then identified, at reference 286, and compared, at reference 288, with each of the third values $ID_3$. If the value of the third byte $B_3$ does not match a possible third value $ID_3$ for a particular type of sensitive data, the tagged string or suspected sensitive data string does not include the type of sensitive data for which the search is being conducted, and the search may be terminated at reference 276.

In some embodiments, if the value of the third byte $B_3$ matches one of the possible third values $ID_3$ of a known identifier of sensitive data (e.g., in embodiments where three matches to characters of the known identifier of sensitive data provides a high level of confidence (e.g., 90% or more, 95% or more, 99% or more, 100%, etc.) that the known identifier is present in the tagged string or suspected sensitive data string, etc.), the process flows to reference 290, where the tagged string or the suspected sensitive data string may be identified as a "likely sensitive data string." Thereafter, the process may proceed back to reference 300 of FIG. 3.

In other embodiments, further analysis may be required to provide a desired level of confidence that the known identifier of sensitive data is present in the tagged string or suspected sensitive data string. In such embodiments, the values of one or more additional bytes of the tagged string or the suspected sensitive data string (e.g., a fourth byte $B_4$, a fifth byte $B_5$, etc.) may be identified and compared with values of additional digits of a known identifier that includes each of the previously identified digit values (i.e., values that correspond to values of each of the first through third bytes $B_1$-$B_3$, values that correspond to values of each of the first through fourth bytes $B_1$-$B_4$, etc.). When the known identifier is a BIN, the process may continue on to a fourth byte and, in some embodiments, to a fifth byte or even a sixth byte. If the desired level of confidence (e.g., 100%, etc.) that the tagged string or suspected sensitive data string includes the known identifier of sensitive data cannot be achieved, the process flows to reference 276, where the tagged string or suspected sensitive data string is disregarded.

In FIG. 4B, the search for a known identifier of sensitive data follows the path of the solid arrows. The broken arrows identify the other groups of values that correspond to a particular value (represented as a circle) from a previous, or higher, level, or generation.

If, in the alternative, the analyzed bytes of the tagged string or suspected sensitive data string match with a desired level of confidence to a known identifier, process flows to reference 290. At reference 290, the tagged string or suspected sensitive data string is identified as a "likely sensitive data string" and the process may then flow to reference 300 of FIG. 3.

In some embodiments, the bytes $B_1$, $B_2$, etc., of a tagged string or a suspected sensitive data string that are analyzed in accordance with the method depicted by FIG. 3 may comprise a series of consecutively arranged bytes that correspond to consecutively arranged digits in a known identifier. In a more specific embodiment, the analyzed bytes $B_1$, $B_2$, etc., may comprise the first bytes of the tagged string of the suspected sensitive data string. In other embodiments, the analyzed bytes $B_1$, $B_2$, etc., may be non-consecutively arranged and correspond to a parallel pattern of non-consecutively arranged digits in a known identifier.

In instances where the evaluation is terminated at reference 276, process may flow to back to FIG. 3. The part of the process of FIG. 3 to which the process returns may depend upon the manner in which data is being evaluated. In embodiments where the evaluation progresses completely in series; i.e., when a tagged string is subjected to further evaluation immediately after the tagged string is identified as including possible data of interest, process may flow back to reference 210 of FIG. 3. At reference 210, the data 44 (FIG. 1) may be searched for more possible data of interest.

In embodiments where further processing is not conducted until all of the data 44 has been evaluated for possible data of interest, and in which all further evaluation of a tagged string is conducted before any further processing is conducted on another tagged string, the evaluation progresses partially in series. When the evaluation progresses partially in series, the process flow may return to reference 250 of FIG. 3, where further evaluation of another tagged string may be initiated.

In embodiments where further evaluation occurs in parallel; i.e., one mode of further evaluation is conducted on all candidates (e.g., tagged strings, suspected sensitive data strings, likely sensitive data strings, etc.) before the next mode of further evaluation of conducted on remaining candidates, the process flow may return to reference 270 of FIG. 3.

Returning reference again to FIG. 3, at reference 300, a likely sensitive data string that has been subjected to and has passed, or survived, at least one of the above-described evaluation processes may then be subjected to further verification. In some embodiments, known processes may be used to determine the likelihood that a string of decimal numerals is an account number for a credit card or debit card. In a specific embodiment, a known validation or "checksum" algorithm, such as the Luhn algorithm, may be used to determine whether or not a potential account number is an actual account number.

Once the evaluation at reference 300 is complete, the process flow may return to another location on FIG. 3. The location to which the process flow returns (e.g., reference 210, 250, 270, or 300) depends, of course, upon whether the evaluation progresses completely in series, partially in series, or in parallel.

While the above-described systems and processes have been described in terms of searches for potential credit card or debit card account numbers, they are also applicable to searches for other sensitive types of information, including bank account numbers, Social Security numbers, drivers license numbers, and the like.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions, and modifications to the invention, as disclosed herein, that fall within the meaning and scopes of the claims are to be embraced by the claims.

What is claimed:

1. A system for identifying potentially sensitive information, comprising:
   a collection system that receives data including potentially sensitive information;
   an approved scanning vendor with a scanning device that communicates with the collection system and programmed to:
     scan the collection system to identify any potentially sensitive data strings, each potentially sensitive data string comprising a series of consecutive digits having a same length or a same range of lengths as a complete length or a complete range of lengths of sensitive data of interest in which each digit of the series of consecutive digits is a decimal number;
     sequentially and individually evaluate a subseries of consecutive digits at a beginning of the series of consecutive digits of each potentially sensitive data string to determine whether the subseries of consecutive digits corresponds to a known identifier of the sensitive data of interest;
     compare a first value of a first digit of the subseries of consecutive digits to a group consisting of known values of first digits of a plurality of identifiers of the sensitive data of interest and
       if the first value of the first digit does not correspond to a first known value of a first digit of a bank identification number, terminate evaluation of the series of consecutive digits; or
       if the first value of the first digit matches a known value of first digits of the plurality of identifiers of the sensitive data of interest, compare a second value of a second digit of the subseries of consecutive digits to a group consisting of values of second digits known to correspond to the first value of the first digit in a plurality of identifiers of the sensitive data of interest.

2. The system of claim 1, wherein the approved scanning vendor is further programmed to:
   if the second value of the second digit does not correspond to a second known value of a second digit of a bank identification number, terminate the evaluation of the consecutive digits; or
   if the second value of the second digit matches a known value of second digits of the plurality of identifiers of the sensitive data of interest, compare a third value of a third digit of the subseries of consecutive digits to a group consisting of values of third digits known to correspond to the value of the second digit in at least one identifier of the sensitive data of interest.

3. The system of claim 2, wherein the approved scanning vendor is further programmed to:
   if the third value of the third digit does not correspond to a third known value of a third digit of a bank identification number, terminate evaluation of the consecutive digits; or
   if the third value of the third digit matches a known value of third digits of the plurality of identifiers of the sensitive data of interest, identify each potentially sensitive data string that includes a subseries of consecutive digits with first, second, and third digits with values that correspond to values of at least one identifier of the sensitive data of interest as a sensitive data string.

4. The system of claim 3, wherein the second digit immediately follows the first digit in series and the third digit immediately follows the second digit in series.

5. The system of claim 4, wherein the second digit of the at least one identifier of the sensitive data of interest immediately follows the first digit of the at least one identifier of the sensitive data of interest in series and the third digit of the at least one identifier immediately follows the second digit of the at least one identifier of the sensitive data of interest in series.

6. The system of claim 3, wherein the approved scanning vendor is further programmed to:
   compare a fourth value of a fourth digit of the subseries of consecutive digits to a group consisting of values of fourth digits known to correspond to the value of the third digit in at least one identifier of the sensitive data of interest.

7. The system of claim 6, wherein the plurality of identifiers of the sensitive data of interest comprises a plurality of bank identification numbers and the at least one identifier of the sensitive data of interest comprises at least one bank identification number.

8. The system of claim 1, wherein the collection device comprises a merchant collection device and the sensitive data of interest comprises a potential bank card number.

9. A system for identifying potentially sensitive information, comprising:
   a collection system that receives data including potentially sensitive information and a memory device associated with the collection system and in which data including potentially sensitive information is stored; and
   an approved scanning vendor with a scanning device in communication with the memory device of the collection system and programmed to perform a process including:
     identifying a series of consecutive digits as a potentially sensitive data string if:
       the series of consecutive digits has a length of a string of sensitive information; and
       each digit of the series of consecutive digits has a value corresponding to a value of a group of known possible values for a string of sensitive information;
     sequentially and individually evaluating a subseries of consecutive digits at a beginning of the series of consecutive digits of each potentially sensitive data string to determine whether the subseries of consecutive digits corresponds to a string of sensitive information;
     comparing a first value of a first digit of the subseries of consecutive digits to a group consisting of known values of first digits of a plurality of identifiers of strings of sensitive information; and only if the first value of the first digit matches at least one known value of a first digit of the plurality of identifiers, comparing of a second value of a second digit of the subseries of consecutive digits to a group consisting of values of second digits known to correspond to the first value of the first digit in the plurality of identifiers.

10. The system of claim 9, further comprising:
an administrator that commissions scanning of the memory device by the approved scanning vendor.

11. The system of claim 10, wherein the scanning device is also programmed to:
report the sensitive data string to the administrator.

12. The system of claim 9, wherein the process performed by the scanning device further comprises:
only if the second value of the second digit matches at least one known value of a second digit of the plurality of identifiers that begins with the first digit, comparing a third value of a third digit of the subseries of consecutive digits to a group consisting of values of third digits known to correspond to the value of the second digit in a plurality of identifiers; and
only if the first, second, and third digits correspond to a subseries of consecutive digits at the beginning of a string of sensitive information, identifying each potentially sensitive data string that begins with the first, second, and third digits as a sensitive data string.

13. The system of claim 12, wherein the process performed by the scanning device further comprises:
only if the third value of the third digit matches at least one known value of a third digit of the plurality of identifiers that begins with the first and second digits, comparing a fourth value of a fourth digit of the subseries of consecutive digits to a group consisting of values of fourth digits known to correspond to the value of the third digit in at least one identifier; and
only if the first, second, third, and fourth digits correspond to a subseries of consecutive digits at the beginning of a string of sensitive information, identifying each potentially sensitive data string that begins with the first, second, third, and fourth digits as a sensitive data string.

14. A system for identifying potential payment card numbers, comprising:
a merchant with a merchant collection system that receives bank card transaction information comprising data including potentially sensitive information;
an approved scanning vendor with a scanning device for evaluating data including potential payment card numbers stored by the merchant collection system and programmed to:
identify a series of consecutive digits of thirteen digits to sixteen digits in which each digit is a decimal number as a potentially sensitive data string;
sequentially and individually evaluate digits at a beginning of a group of digits of the potentially sensitive data string to determine whether the group of digits of the potentially sensitive data string collectively corresponds to a known bank identification number;
a comparison of a first value of a first digit of the series of consecutive digits to a group consisting of known values of first digits of a plurality of bank identification numbers; and
only if the first value corresponds to a first known value of a first digit of a bank identification number, then a comparison of a second value of a second digit of the series of consecutive digits to a group consisting of values of second digits known to correspond to the first value of the first digit in the plurality of bank identification numbers.

15. The system of claim 14, wherein the scanning device is programmed to sequentially and individually evaluate the digits at the beginning of the group of digits of the potentially sensitive data string further by:
only if the second value corresponds to a second known value of a second digit of a bank identification number that begins with the first digit, then a comparison of a third value of a third digit of the series of consecutive digits to a group consisting of values of third digits known to correspond to the value of the second digit in a plurality of bank identification numbers; and
only if the third value corresponds to a third known value of a third digit of a bank identification number that begins with the first digit and the second digit, then a comparison of a fourth value of a fourth digit of the series of consecutive digits to a group consisting of values of fourth digits known to correspond to the value of the third digit in at least one bank identification number; and
only if the first, second, third, and fourth values correspond to first, second, third, and fourth digits of a bank identification number, identify the potentially sensitive data string as a suspected payment card number.

16. The system of claim 15, wherein the group of digits of the suspected payment card number comprises a first four digits, a first five digits, or a first six digits of the suspected payment card number.

17. The system of claim 14, further comprising:
an administrator that sets a data security standard and commissions scanning of the merchant collection system by the approved scanning vendor to determine the merchant's compliance with the data security standard.

18. The system of claim 17, wherein the administrator comprises at least one of an acquirer and an issuer.

19. The system of claim 17, further comprising:
a compliance monitor that operates the scanning device when commissioned by the administrator.

* * * * *